(12) United States Patent
Li

(10) Patent No.: US 11,704,186 B2
(45) Date of Patent: Jul. 18, 2023

(54) ANALYSIS OF DEEP-LEVEL CAUSE OF FAULT OF STORAGE MANAGEMENT

(71) Applicant: EMC IP Holding Company LLC, Hopkinton, MA (US)

(72) Inventor: Kelvon Naifeng Li, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 162 days.

(21) Appl. No.: 17/122,833

(22) Filed: Dec. 15, 2020

(65) Prior Publication Data

US 2022/0138032 A1 May 5, 2022

(30) Foreign Application Priority Data

Oct. 30, 2020 (CN) .......................... 202011196738.1

(51) Int. Cl.
| | |
|---|---|
| *G06F 11/00* | (2006.01) |
| *G06F 11/07* | (2006.01) |
| *G06F 18/243* | (2023.01) |
| *G06F 18/24* | (2023.01) |

(52) U.S. Cl.
CPC ........ *G06F 11/079* (2013.01); *G06F 11/0727* (2013.01); *G06F 11/0772* (2013.01); *G06F 18/24323* (2023.01); *G06F 18/24765* (2023.01)

(58) Field of Classification Search
None
See application file for complete search history.

(56) References Cited

U.S. PATENT DOCUMENTS

| | | | | |
|---|---|---|---|---|
| 10,255,128 | B2* | 4/2019 | Rupp | G06F 11/0775 |
| 10,666,494 | B2* | 5/2020 | Zafer | H04L 41/0609 |
| 2008/0133288 | A1* | 6/2008 | Thibaux | G06Q 10/04 |
| | | | | 714/26 |
| 2011/0320857 | A1* | 12/2011 | Kwon | H04L 41/0672 |
| | | | | 714/2 |
| 2015/0280968 | A1* | 10/2015 | Gates | G06F 11/0769 |
| | | | | 714/37 |

(Continued)

OTHER PUBLICATIONS

"An overview of fault tree analysis and its application in model based dependability analysis", Kabir, Sohang; University of Bradford, 2017 (Year: 2017).*

(Continued)

*Primary Examiner* — Christopher S McCarthy
(74) *Attorney, Agent, or Firm* — Amin, Turocy & Watson, LLP

(57) ABSTRACT

Storage management is performed. For example, a computing device may determine that a fault belongs to one of a plurality of predefined fault categories based on description information of the fault of a storage system. Then, the computing device may determine at least one fault cause associated with the fault category at a first level of a hierarchical structure of predetermined fault causes. Further, the computing device may determine a first fault cause that causes the fault among the at least one fault cause. After that, the computing device may determine a target fault cause at the deepest level that causes the fault based on the first fault cause. As a result, the root cause of a fault of a storage system may be accurately and efficiently determined, thereby providing the possibility of fundamentally eliminating the fault.

20 Claims, 6 Drawing Sheets

(56) References Cited

U.S. PATENT DOCUMENTS

| | | | |
|---|---|---|---|
| 2015/0288557 A1* | 10/2015 | Gates | G06F 11/0709 |
| | | | 714/37 |
| 2017/0139764 A1* | 5/2017 | Batchelor | G06F 3/06 |
| 2019/0227860 A1* | 7/2019 | Gefen | G06F 16/9024 |
| 2020/0012551 A1* | 1/2020 | Liang | G06F 16/2455 |
| 2021/0168021 A1* | 6/2021 | Wang | G06K 9/6276 |

OTHER PUBLICATIONS

Google Scholar/Patents search—text refined (Year: 2022).*
Google Scholar/Patents search—text refined (Year: 2023).*

* cited by examiner

ANALYSIS OF DEEP-LEVEL CAUSE OF FAULT OF STORAGE MANAGEMENT

RELATED APPLICATION

The present application claims the benefit of priority to Chinese Patent Application No. 202011196738.1, filed on Oct. 30, 2020, which application is hereby incorporated into the present application by reference herein in its entirety.

TECHNICAL FIELD

Embodiments of the present disclosure generally relate to a computer system or a storage system, and more particularly, to a method, an electronic device, and a computer program product for storage management.

BACKGROUND

In the development or maintenance of a storage product or a storage system, research and efforts on the integration of fault analysis functions and automatic fault testing have lasted for many years. In such studies, fault cause analysis (also referred to as triage) of faults of the storage system has always been the biggest problem due to the fact that the storage system is usually very complex.

In the most common scenarios, fault cause analysis of the storage system is still done manually by engineers. This requires the engineers to pay too much energy and communication and slows down the overall development efficiency of the storage product. In particular, the storage product often includes many components involving different technologies. Most engineers are generally proficient in a particular technical field, but know little about components in other technical fields, so that they cannot perform effective fault cause analysis on faults of the storage system.

SUMMARY

The embodiments of the present disclosure propose a technical solution for determining a deep-level cause of a fault of a storage system, and specifically provide a method, an electronic device, and a computer program product for storage management.

In a first aspect of the present disclosure, a method for storage management is provided. The method includes: determining, based on description information of a fault of a storage system, that the fault belongs to one of a plurality of predefined or defined fault categories. The method further includes: determining at least one fault cause associated with the fault category at a first level of a hierarchical structure of predetermined or otherwise defined fault causes. The method further includes: determining a first fault cause that causes the fault among the at least one fault cause. The method further includes: determining a target fault cause at the deepest level that causes the fault based on the first fault cause.

In a second aspect of the present disclosure, an electronic device is provided. The electronic device includes at least one processor and at least one memory storing computer program instructions. The at least one memory and the computer program instructions are configured to cause, along with the at least one processor, the electronic device to: determine, based on description information of a fault of a storage system, that the fault belongs to one of a plurality of predefined or defined fault categories. The at least one memory and the computer program instructions are further configured to cause, along with the at least one processor, the electronic device to: determine at least one fault cause associated with the fault category at a first level of a hierarchical structure of predetermined or otherwise defined fault causes. The at least one memory and the computer program instructions are further configured to cause, along with the at least one processor, the electronic device to: determine a first fault cause that causes the fault among the at least one fault cause. The at least one memory and the computer program instructions are further configured to cause, along with the at least one processor, the electronic device to: determine a target fault cause at the deepest level that causes the fault based on the first fault cause.

In a third aspect of the present disclosure, a computer program product is provided. The computer program product is tangibly stored on a non-volatile computer-readable medium and includes machine-executable instructions. The machine-executable instructions, when executed, cause a machine to execute steps of the method according to the first aspect.

It should be understood that the content described in the summary part is neither intended to limit key or essential features of the embodiments of the present disclosure, nor intended to limit the scope of the present disclosure. Other features of the present disclosure will become readily understandable through the following description.

BRIEF DESCRIPTION OF THE DRAWINGS

The above and other objectives, features, and advantages of the embodiments of the present disclosure will become readily understandable by reading the following detailed description with reference to the accompanying drawings. In the accompanying drawings, a plurality of embodiments of the present disclosure are shown by way of example and not limitation.

Throughout all the accompanying drawings, the same or similar reference numerals are used to indicate the same or similar components.

DETAILED DESCRIPTION

Figure 1:
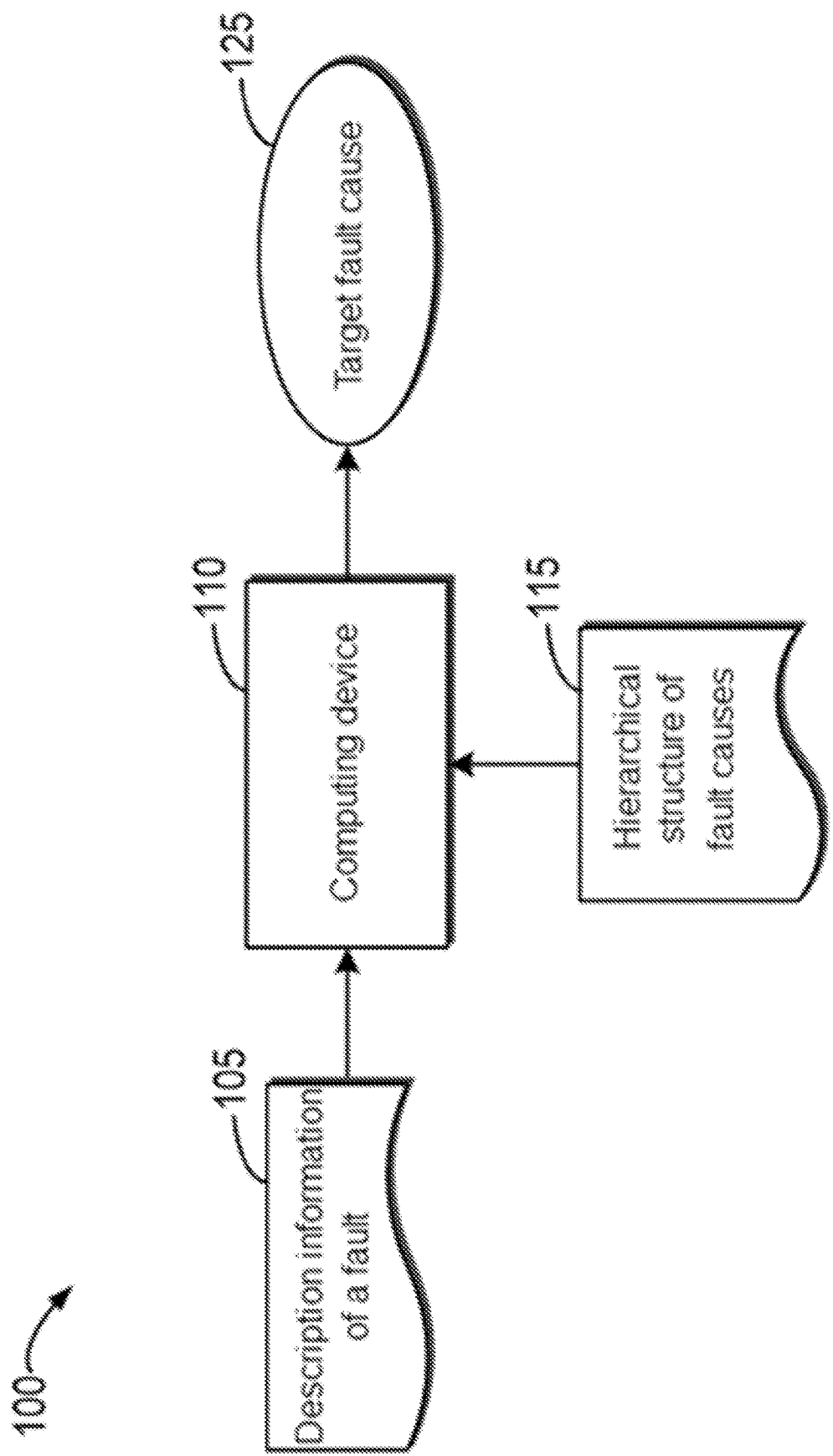
FIG. 1 shows a schematic diagram of an example fault analysis system in which an embodiment of the present disclosure may be implemented.

The principles and spirit of the present disclosure will be described below with reference to a plurality of example embodiments shown in the accompanying drawings. It should be understood that these embodiments are described only for the purpose of enabling a person skilled in the art to better understand and then implement the present disclosure, instead of limiting the scope of the present disclosure in any way. In the description and claims herein, unless otherwise defined, all technical and scientific terms used herein have meanings that are commonly understood by those of ordinary skill in the art to which the present disclosure belongs.

As mentioned above, the storage product often includes many components involving different technologies. Most engineers are generally proficient in a particular technical field, but know little about components in other technical fields, so that they cannot perform effective fault cause analysis on faults of the storage system. Therefore, analysis of the cause of a certain fault of the storage system may require the engineers to seek the attention and help of other engineers and technicians in other fields to make the fault cause analysis meaningful. This makes it difficult to develop and expand a fault cause analysis project for the storage system, because it requires more and more manpower to perform more and more fault analysis tasks.

Some traditional fault analysis systems try to check for obvious problems by scanning collected fault data. However, such a fault analysis system can only find obvious and common problems, but cannot determine a fault cause or system defect at a deeper level that needs to be tracked. For example, a traditional fault analysis system usually fails to point out the fault cause, but only points out a cause that has nothing to do with the system defect, or provides a superficial fault cause. Therefore, the traditional fault analysis system does not provide a system or solution for reasoning the fault cause at a deep level, thereby leading to a fault in the storage system or other systems to be unable to be effectively and fundamentally eliminated or resolved.

In view of the foregoing problems and other potential problems in the traditional solution, the embodiments of the present disclosure propose a technical solution for determining a fault cause at a deep level of a storage system. In an embodiment of the present disclosure, a computing device may determine, based on description information of a fault of the storage system, that the fault belongs to one of a plurality of predefined or defined fault categories. Then, the computing device may determine at least one fault cause associated with the fault category at a first level of a hierarchical structure of predetermined or otherwise defined fault causes. Further, the computing device may determine a first fault cause that causes the fault among the at least one fault cause. After that, the computing device may determine a target fault cause at the deepest level that causes the fault based on the first fault cause.

Through the embodiments of the present disclosure, the root cause of a fault in a storage system or other systems may be accurately and efficiently determined, thereby providing the possibility of fundamentally and effectively eliminating the fault. Based on this, the embodiments of the present disclosure may provide a general-purpose system fault automatic analysis system, which may effectively find out the root cause of a system fault. In other words, the embodiments of the present disclosure may provide a root cause analysis capacity for any general problem cause analysis solution across products, which is a precondition for automatic triage of system faults. Some example embodiments of the present disclosure will be described below with reference to the accompanying drawings.

FIG. 1 shows a schematic diagram of example fault analysis system 100 in which an embodiment of the present disclosure may be implemented. As shown in FIG. 1, fault analysis system 100 may include computing device 110 that may receive description information 105 about a fault in a storage system. For example, a system defect may be provided by the storage system or related fault detection equipment. As used herein, description information 105 of the fault generally refers to information used to describe patterns of the fault that has occurred, and usually does not involve information about the cause of the fault. It should be noted that although some embodiments of the present disclosure are described below by taking the fault in the storage system as an example, fault analysis system 100 provided by the embodiment of the present disclosure may be generally applicable to any other systems that may have faults.

After receiving description information 105 of the fault, computing device 110 may determine target fault cause 125 that causes the fault based on hierarchical structure 115 of predetermined fault causes. As used herein, hierarchical structure 115 of fault causes may be a kind of data or information related to various fault causes, which includes multiple different levels of fault causes, and each level of fault causes may include one or more fault causes. In addition, hierarchical structure 115 of fault causes also records the relevance or correlation among the fault causes at different levels. For example, a certain fault cause at an upper level may be caused by a fault cause at the next level thereof.

As used herein, target fault cause 125 may refer to a fault cause at the deepest level that may be determined by computing device 110 in hierarchical structure 115 of fault causes for a particular fault. In other words, for the particular fault, computing device 110 may determine fault causes that cause the fault in hierarchical structure 115 of fault causes level by level, such as a fault cause at the first level, a fault cause at the second level, and a fault cause at the third level, until the determined fault cause no longer includes the fault cause at the next level. The fault cause determined by computing device 110 at this time is target fault cause 125. In this article, target fault cause 125 that causes the fault may also be referred to as the root cause of the fault.

In some embodiments, computing device 110 may include any devices capable of implementing computing functions and/or control functions, including but not limited to, special-purpose computers, general-purpose computers, general-purpose processors, microprocessors, microcontrollers, or state machines. Computing device 110 may also be implemented as an individual computing device or a combination of computing devices, for example, a combination of a digital signal processor (DSP) and a microprocessor, a plurality of microprocessors, one or more microprocessors combined with a DSP core, or any other such configurations. In addition, it should be pointed out that in the context of the present disclosure, computing device 110 may also be referred to as electronic device 110, and these two terms may be used interchangeably herein.

In some embodiments, storage devices of the storage system involved in the present disclosure may be any device or system having a storage capability and capable of providing a storage service or function, including but not limited to, a backup storage site, a cloud storage system, a hard disk drive (HDD), a solid state disk (SSD), a removable disk, a compact disk (CD), a laser disk, an optical disk, a digital versatile disk (DVD), a floppy disk, a Blu-ray disk, a serial-attached small computer system Interface (SCSI) storage disk (SAS), a serial advanced technology attachment (SATA) storage disk, any other magnetic storage devices and any other optical storage devices, or any combination thereof.

In some embodiments, a data source or client terminal in the storage system involved in the present disclosure may refer to any device that can generate data and receive data storage services. In some embodiments, such devices include, but are not limited to, personal computers, tablet computers, laptop computers, notebook computers, netbook computers, any other types of computers, cellular phones or smart phones, media player devices, e-book devices, mobile WiFi devices, wearable computing devices, wireless devices, mobile devices, user equipment, and any other types of electronic computing devices.

In some embodiments, communication links between various components of the storage system involved in the present disclosure may be any form of connection or coupling that can achieve data communication or control signal communication between these components, including but not limited to, coaxial cables, fiber-optic cables, twisted pairs, or wireless technology (such as infrared, radio, and microwaves). In some embodiments, the communication links may also include, but are not limited to, network cards, hubs, modems, repeaters, bridges, switches, routers, and other devices used for network connection, as well as various network connection lines, wireless links, etc. In some embodiments, the communication links may include various types of buses. In other embodiments, the communication links may include computer networks, communication networks, or other wired or wireless networks.

It should be understood that FIG. 1 only schematically shows units, elements, modules, or components related to the embodiment of the present disclosure in fault analysis system 100. In practice, fault analysis system 100 may also include other units, elements, modules, or components for other functions. In addition, the particular number of units, elements, modules, or components shown in FIG. 1 is only illustrative, and is not intended to limit the scope of the present disclosure in any way. In other embodiments, fault analysis system 100 may include any suitable number of computing devices and related elements. Accordingly, the embodiments of the present disclosure are not limited to specific scenario described in FIG. 1, but are generally applicable to any technical environments that need to perform fault analysis.

Figure 2:
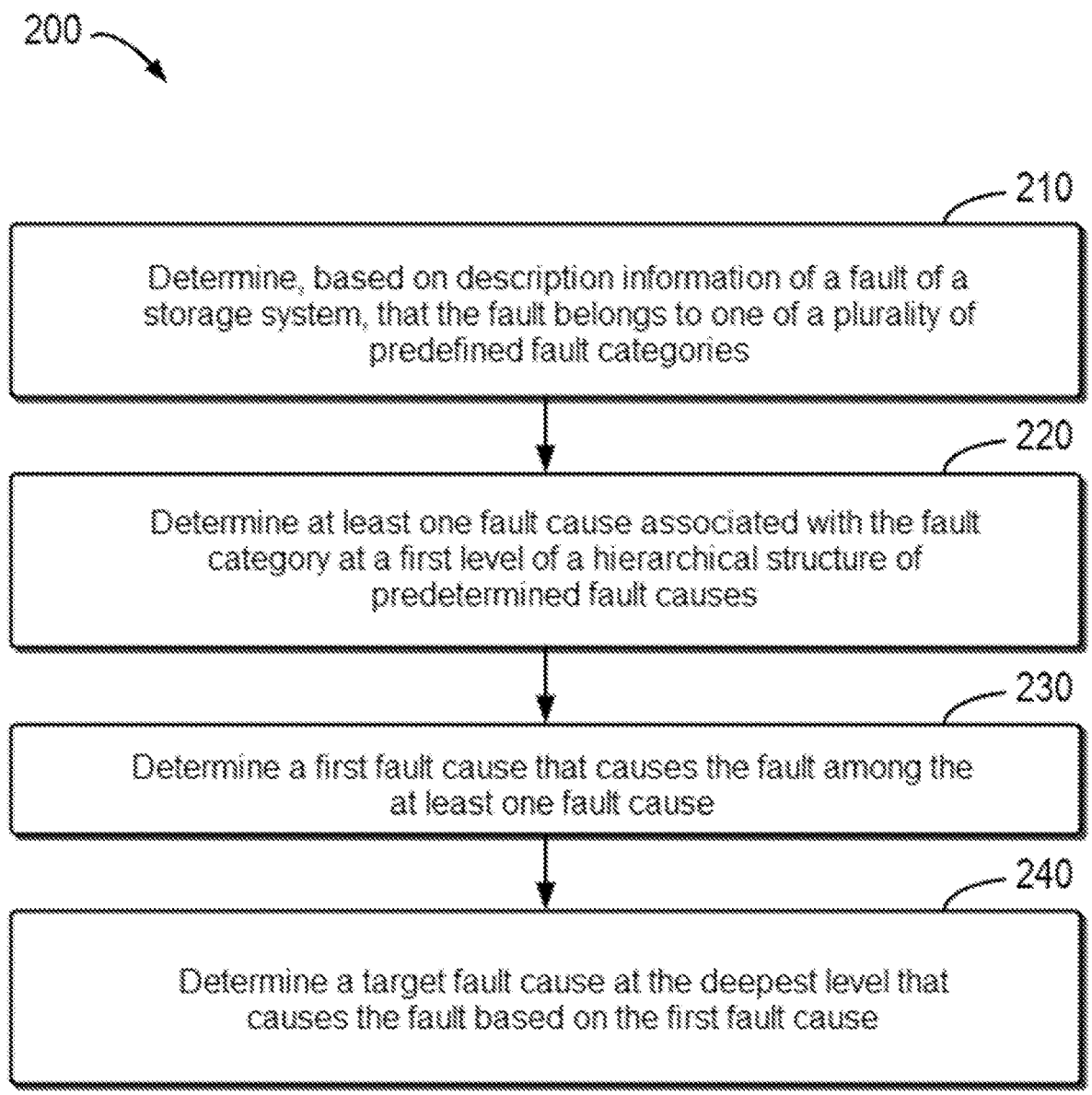
FIG. 2 shows a flowchart of an example storage management method according to an embodiment of the present disclosure.

FIG. 2 shows a flowchart of example storage management method 200 according to an embodiment of the present disclosure. In some embodiments, example method 200 may be implemented by computing device 110 in fault analysis system 100, for example, may be implemented by a processor or processing unit of computing device 110, or implemented by various functional modules of computing device 110. In other embodiments, example method 200 may also be implemented by a computing device independent of fault analysis system 100, or may be implemented by other units or modules in fault analysis system 100. For ease of discussion, example method 200 will be described in conjunction with FIG. 1.

At block 210, computing device 110 may determine that a fault of a storage system belongs to one of a plurality of predefined fault categories based on description information 105 of a fault of the storage system. In other words, computing device 110 may classify faults according to description information 105. As used herein, description information 105 of the fault generally refers to information used to describe patterns of a fault that has occurred, and usually does not involve information about the cause of the fault. For example, description information 105 may describe when, where, and in what form the storage system has a fault that does not match an expected function, and the like. Of course, description information 105 of the embodiment of the present disclosure is not limited to a certain specific form or specific content, but may generally refer to any appropriate related information related to the fault.

Since description information 105 describes information related to the fault, and there are a plurality of predefined fault categories, computing device 110 may determine which fault category the fault described in description information 105 belongs to according to predetermined classification rules. It should be noted that the classification rules used by computing device 110 to classify faults may correspond to the plurality of predefined fault categories. As an example, if the plurality of predefined fault categories are broad categories, such as input/output (I/O) faults, operating system faults, storage media faults, and bus communication faults, the fault classification rules may focus on whether description information 105 describes broader features or keywords corresponding to the above-mentioned fault classification. As another example, if the plurality of predefined fault categories are more detailed categories, such as input/output (I/O) faults in a particular storage location, faults in a particular module of the operating system, a certain type of faults of a physical storage medium, and a certain type of faults of bus communication, the fault classification rules may need to determine whether description information 105 describes more specific features or keywords corresponding to these detailed fault classifications.

Therefore, in some embodiments, the classification rules used by computing device 110 to classify faults may be configurable. In other words, computing device 110 may configure or adjust the classification rules accordingly according to the addition or change of the fault categories. Regarding this, it should be noted that in some embodiments, the plurality of predefined fault categories may also be configured or updated by computing device 110. That is, computing device 110 may increase, decrease, modify, or adjust the plurality of predefined fault categories as needed. In addition, when the fault categories have not changed, computing device 110 may also reconfigure or adjust the classification rules to make the fault classification more accurate. In these embodiments, in order to determine which fault category the fault described by description information 105 belongs to, computing device 110 may classify the fault into a particular fault category based on the configurable classification rules. In this way, the accuracy and flexibility of computing device 110 for fault classification may be improved.

At block 220, computing device 110 may determine one or more fault causes associated with the fault category obtained in block 210 at the first level of hierarchical structure 115 of predetermined fault causes. As used herein, hierarchical structure 115 of fault causes refers to a hierarchical organizational structure organized by different levels of fault causes according to their mutual causality or other relevance. For example, in hierarchical structure 115 of fault causes, a fault cause at an upper level may be a broader or generalized cause relative to the fault cause at the next level, while the fault cause at the next level may be a more specific cause relative to the fault cause at the upper level. In other words, the lower the level of a fault cause in hierarchical structure 115 means that the fault cause is a lower level cause, that is, a deeper level cause.

In some embodiments, each of the fault causes in hierarchical structure 115 of fault causes may be associated with different technical fields involved in the storage system or other systems. In such an embodiment, the fault cause may also be referred to as "a problem or an error in a certain technical field." For example, relatively high-level fault causes related to a technical field may be errors in a physical storage medium, errors in bus communication, errors in operating system software, errors in a mechanical structure of equipment installation, or the like. These fault causes respectively involve technical fields of storage hardware, bus communication, software, mechanical installation, and the like. For another example, relatively low-level fault causes related to a technical field may be errors in a certain part of the physical storage medium, errors in a certain protocol of the bus communication, errors in a certain module of the operating system software, errors in a certain part of the mechanical structure of the equipment installation, or the like. It will be understood that the fault causes in different technical fields listed above are only illustrative and are not intended to limit the scope of the present disclosure in any way. In other embodiments, the fault causes in different technical fields may involve other technical fields, have more levels, and may have different numbers of levels.

Generally speaking, hierarchical structure 115 of fault causes may be represented by any structure having a hierarchical relationship, such as a table, a chain structure, or other hierarchical structures used to represent the hierarchical relationship among various fault causes. In some embodiments, hierarchical structure 115 of fault causes may include a tree structure of fault causes, so as to more accurately, clearly, and concisely represent the relevance among various fault causes in hierarchical structure 115 of fault causes.

In hierarchical structure 115 of predetermined fault causes, computing device 110 may find out a fault cause at the first level associated with the fault category determined in block 110, that is, a fault cause at the most shallow level. It should be noted that computing device 110 may determine one or more fault causes associated with a particular fault category at the first level of hierarchical structure 115 in any suitable manner. For example, in an "exhaustive" manner, computing device 110 may consider that all fault causes at the first level of hierarchical structure 115 are related to the particular fault category. However, this "exhaustive" manner may be disadvantageous when a large number of fault causes are included at the first level of hierarchical structure 115. For another example, computing device 110 may determine a related fault cause at the first level according to features of the particular fault category. More specifically, if the fault category is an I/O error of a certain storage disk, the related fault cause at the first level may be a physical storage medium error, a bus communication error, an I/O software error, or the like.

In some embodiments, the relevance between the plurality of fault categories and the first level of hierarchical structure 115 of fault causes may be predetermined. For example, this relevance may be determined based on historical data or technical experience, and may be recorded in the fault diagnosis data. In other words, the fault diagnosis data may record the correlation between the plurality of fault categories and the first level of hierarchical structure 115. In such a case, during the determination of one or more fault causes associated with the particular fault category at the first level of hierarchical structure 115, computing device 110 may determine such one or more fault causes based on the fault diagnosis data. In this way, because the fault diagnosis data can be continuously improved based on historical data, technical experience, etc., the accuracy and efficiency of computing device 110 in determining the fault cause at the first level associated with a certain fault category may be improved. A specific example of the fault diagnosis data will be described below with reference to FIG. 3.

Figure 3:
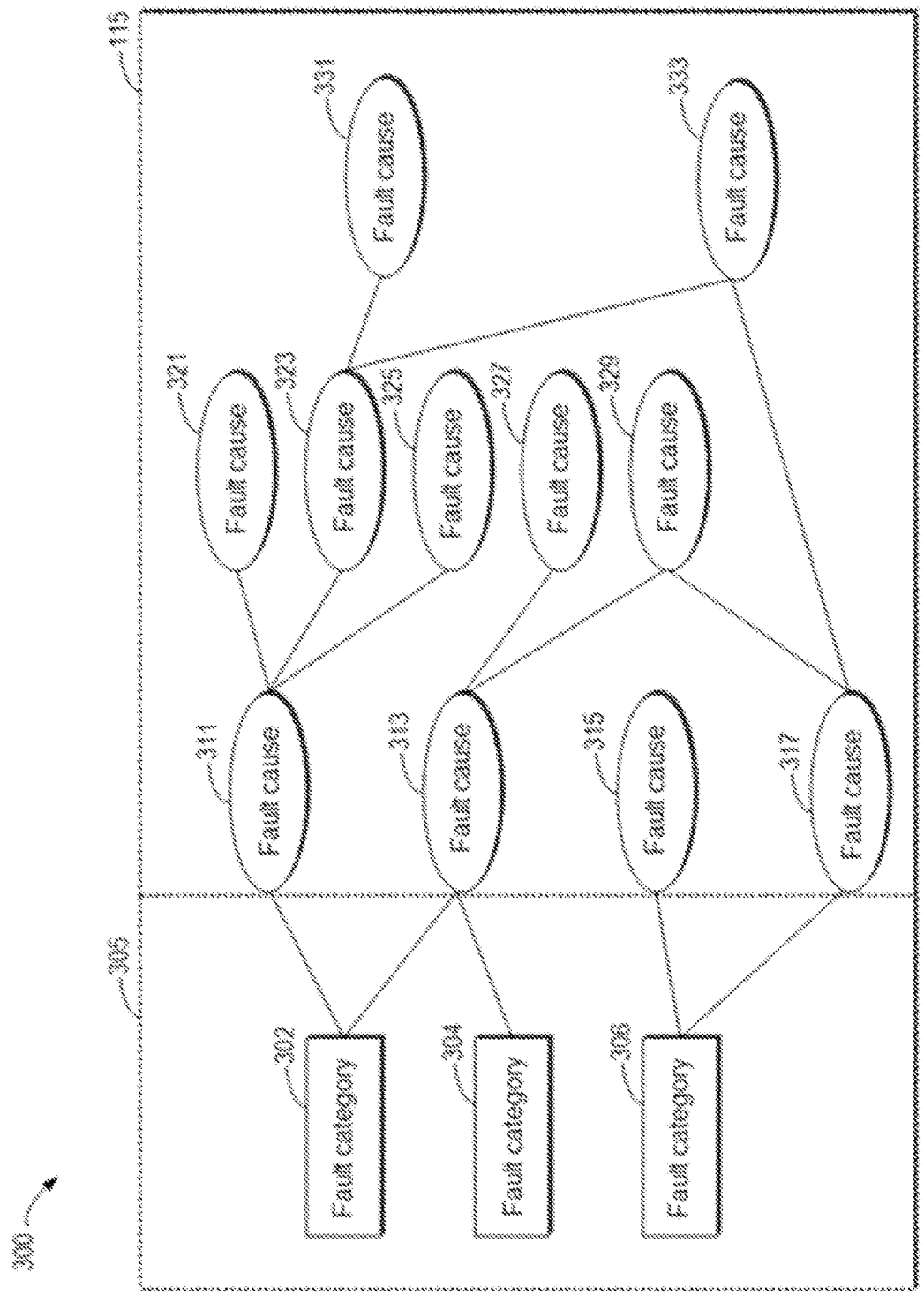
FIG. 3 shows example fault diagnosis data according to an embodiment of the present disclosure, which may include a hierarchical structure of fault causes and the correlation between fault categories and the first level.

FIG. 3 shows example fault diagnosis data 300 according to an embodiment of the present disclosure, which may include hierarchical structure 115 of fault causes and correlation 305 between fault categories and the first level. It should be noted that although in the example of FIG. 3, fault diagnosis data 300 is shown to include both correlation 305 and hierarchical structure 115, this is only illustrative and is not intended to limit the scope of the present disclosure in any way. In other embodiments, fault diagnosis data 300 may also only include correlation 305 between the fault categories and the first level, instead of hierarchical structure 115 of fault causes. In addition, the particular number of fault categories, fault causes, and fault cause levels shown in FIG. 3, as well as the particular correlation among them, is only illustrative, and is not intended to limit the scope of the present disclosure in any way. In other embodiments, fault diagnosis data 300 may include any appropriate number of fault categories, fault causes, and fault cause levels, and may have any appropriate correlation among them.

In the example of FIG. 3, correlation 305 shows that fault category 302 is associated with fault causes 311 and 313 at the first level of hierarchical structure 115. That is, fault causes 311 and 313 may cause a fault belonging to fault category 302. Similarly, correlation 305 shows that fault category 304 is associated with fault cause 313 at the first level of hierarchical structure 115. That is, fault cause 313 may cause a fault belonging to fault category 304. In addition, correlation 305 shows that fault category 306 is associated with fault causes 315 and 317 at the first level of hierarchical structure 115. That is, fault causes 315 and 317 may cause a fault belonging to fault category 306.

In the example of FIG. 3, hierarchical structure 115 shows that fault cause 311 at the first level includes fault causes 321, 323, and 325 at the second level. In other words, the broader fault cause 311 may be more specifically caused by more detailed fault causes 321, 323, and 325. Similarly, hierarchical structure 115 shows that fault cause 313 at the first level includes fault causes 327 and 329 at the second level. In other words, the broader fault cause 313 may be more specifically caused by more detailed fault causes 327 and 329. In addition, hierarchical structure 115 shows that fault cause 315 at the first level does not include the fault causes at the second level. Furthermore, hierarchical structure 115 shows that fault cause 317 at the first level includes fault causes 329 and 333 at the second level. In other words, the broader fault cause 317 may be more specifically caused by more detailed fault causes 329 and 333.

Further, hierarchical structure 115 shows that fault cause 323 at the second level includes fault causes 331 and 333 at the third level. In other words, the broader fault cause 323 may be more specifically caused by more detailed fault causes 331 and 333. It should be noted that for fault cause 317 at the first level, fault cause 333 is a fault cause at the second level, and for fault cause 323 at the second level, fault cause 333 is a fault cause at the third level. Therefore, the level to which a certain fault cause belongs may depend on the level of a fault cause at the upper level thereof.

In some embodiments, hierarchical structure 115 of fault causes may be expanded or updated. Therefore, if computing device 110 determines a new fault cause that is not included in hierarchical structure 115, computing device 110 may add the new fault cause into hierarchical structure 115. Thus, the effectiveness and flexibility of hierarchical structure 115 of fault causes may be improved. More generally, in addition to adding a new fault cause, computing device 110 may also delete an original fault cause in hierarchical structure 115, adjust the content of existing fault causes, or adjust the correlation between two fault causes, as required. Therefore, the effectiveness and flexibility of hierarchical structure 115 may be further improved.

Therefore, in the example of FIG. 3, assuming that computing device 110 determines that a fault of a storage system belongs to fault category 302, computing device 110 may determine that fault category 302 is associated with fault causes 311 and 313 at the first level of hierarchical structure 115 according to correlation 305. Similarly, if computing device 110 determines that the fault of the storage system belongs to fault category 304, computing device 110 may determine that fault category 304 is associated with fault cause 313 at the first level of hierarchical structure 115 according to correlation 305. If computing device 110 determines that the fault of the storage system belongs to fault category 306, computing device 110 may determine that fault category 306 is associated with fault causes 315 and 317 at the first level of hierarchical structure 115 according to correlation 305.

Referring back to FIG. 2, at block 230, among the one or more fault causes at the first level associated with the fault category determined in block 110, computing device 110 may determine the first fault cause that causes the fault. That is, computing device 110 may find out the particular fault cause that causes the fault among the one or more fault causes at the first level determined in block 220. In the description herein, for the convenience of reference, a fault cause at the first level that causes the fault may also be referred to as a first fault cause.

It will be understood that computing device 110 may determine the first fault cause that causes the fault in any suitable manner. For example, there may be enough information in description information 105 of the fault to determine the first fault cause. In other embodiments, computing device 110 may check the plurality of fault causes at the first level that are associated with the fault category one by one to determine which fault cause causes the fault. Specifically, computing device 110 may determine the first fault cause based on log data associated with the above-mentioned one or more fault causes at the first level. In this way, the accuracy of computing device 110 in determining the first fault cause may be improved. For example, if log data related to a certain fault cause indicates that the fault cause exists, computing device 110 may determine that the fault cause causes the fault. Conversely, if the log data related to the certain fault cause indicates that the fault cause does not exist, computing device 110 may determine that the fault cause does not cause the fault.

In some embodiments, each fault cause at different levels of hierarchical structure 115 may be provided with a corresponding fault analysis component to specifically analyze whether a particular fault cause has occurred or not. In such an embodiment, in order to determine the first fault cause that causes the fault, computing device 110 may sequentially call the fault analysis components corresponding to the above-mentioned one or more fault causes, thereby performing fault analysis for different fault causes to determine the first fault cause that causes the fault. In this way, since analysis on each fault cause is completed by the fault analysis component provided for each fault cause, the accuracy and efficiency in analysis of the fault cause may be improved.

At block 240, computing device 110 may determine the target fault cause 125 at the deepest level that causes the fault based on the first fault cause that causes the fault. That is, although computing device 110 has determined the first fault cause that causes the fault at the first level of hierarchical structure 115, the first fault cause may not be the deepest level cause that causes the fault. This is because, under the first fault cause, there may be fault causes at the second level, fault causes at the third level, fault causes at the fourth level, etc. Therefore, computing device 110 will determine the fault cause at the deepest level that causes the fault as much as possible on the basis of the first fault cause, so as to provide the possibility of fundamentally eliminating the fault. In the description herein, for the convenience of reference, the fault cause at the deepest level that causes the fault may also be referred to as target fault cause 125.

More specifically, in the process of determining target fault cause 125 based on the first fault cause, if fault causes at the second level are not included under the first fault cause, computing device 110 may determine that the first fault cause is target fault cause 125. Thus, computing device 110 may ensure that the determined target fault cause 125 is the fault cause at the deepest level. For example, in the example of FIG. 3, if computing device 110 determines that the first fault cause is fault cause 315, and there are no fault causes at the second level under fault cause 315, computing device 110 may determine that fault cause 315 is target fault cause 125 at the deepest level that causes the fault.

On the other hand, if the first fault cause includes fault causes at the second level, computing device 110 may determine a second fault cause that causes the fault among the fault causes at the second level. That is, among one or more fault causes belonging to the second level under the first fault cause, computing device 110 further determines the fault cause at the second level that causes the fault. In the description herein, for the convenience of reference, a fault cause at the second level that causes the fault may also be referred to as a second fault cause. For example, in the example of FIG. 3, if computing device 110 determines that the first fault cause is fault cause 311, and there are fault causes 321, 323, and 325 at the second level under fault cause 311, computing device 110 may further determine the second fault cause that causes the fault among the fault causes 321, 323 and 325.

It will be understood that computing device 110 may determine the second fault cause in a manner similar to that of determining the first fault cause. For example, there may be enough information in description information 105 of the fault to determine the second fault cause. In other embodiments, computing device 110 may check a plurality of fault causes at the second level under the first fault cause one by one to determine which fault cause at the second level causes the fault. Specifically, computing device 110 may determine the second fault cause based on log data associated with the plurality of fault causes at the second level. In this way, computing device 110 may improve the accuracy in determining the second fault cause. For example, if log data related to a certain fault cause indicates that the fault cause exists, computing device 110 may determine that the fault cause causes the fault. Conversely, if the log data related to the certain fault cause indicates that the fault cause does not exist, computing device 110 may determine that the fault cause does not cause the fault.

As mentioned above, in some embodiments, each fault cause at different levels may be provided with a corresponding fault analysis component to specifically analyze whether a particular fault cause has occurred or not. In such an embodiment, in order to determine the second fault cause that causes the fault, computing device 110 may sequentially call the fault analysis components corresponding to the plurality of fault causes at the second level under the first fault cause to perform fault analysis for different fault causes, so as to determine the second fault cause that causes the fault. In this way, since analysis on each fault cause is completed by the fault analysis component provided for each fault cause, the accuracy and efficiency in analysis of the fault cause may be improved.

After determining the second fault cause that causes the fault, computing device 110 may determine target fault cause 125 at the deepest level that causes the fault based on the second fault cause. In this way, computing device 110 may ensure that a fault cause at an upper level (for example, the first fault cause) that has a fault cause at the next level will not be determined as target fault cause 125. Specifically, when target fault cause 125 is determined based on the second fault cause, if fault causes at the third level are not included under the second fault cause, computing device 110 may determine the second fault cause as target fault cause 125. Thus, computing device 110 may ensure that the determined target fault cause 125 is the fault cause at the deepest level. On the other hand, if one or more fault causes at the third level are included under the second fault cause, computing device 110 may determine a third fault cause that causes the fault at the third level in a similar manner as described above. In the description herein, for the convenience of reference, a fault cause at the third level that causes the fault may also be referred to as a third fault cause.

After determining the third fault cause that causes the fault, computing device 110 may determine target fault cause 125 at the deepest level based on the third fault cause. In this way, computing device 110 may ensure that a fault cause at an upper level (for example, the second fault cause) that has a fault cause at the next level will not be determined as target fault cause 125. Through level-by-level iteration like this, computing device 110 may finally determine target fault cause 125 at the deepest level that causes the fault, regardless of how many levels exist in the hierarchical structure of fault causes. Therefore, through example method 200, the root cause of the fault of the storage system may be accurately and efficiently determined, thereby providing the possibility of fundamentally eliminating the fault.

Figure 4:
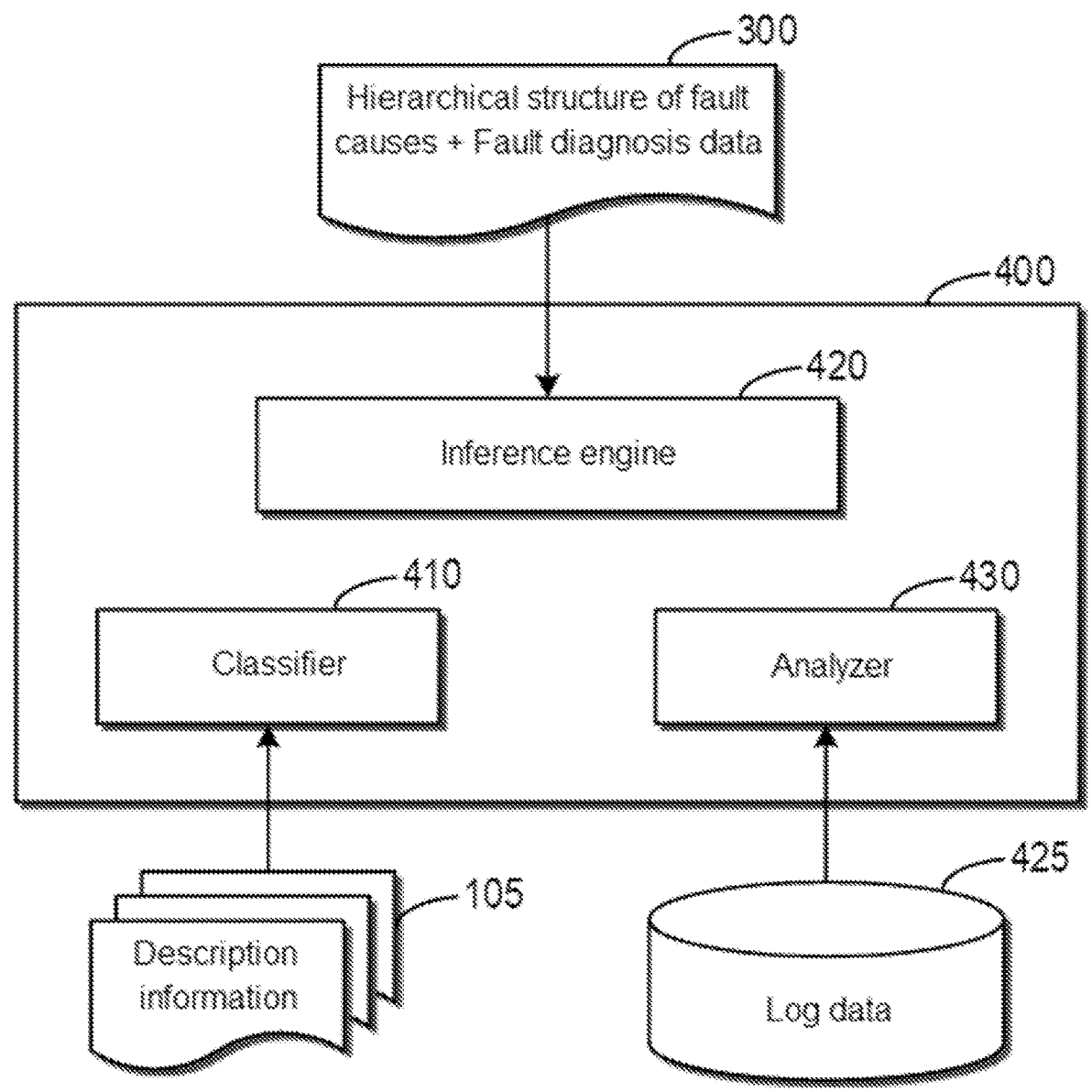
FIG. 4 shows a schematic diagram of a high-level architecture of an example storage management system according to an embodiment of the present disclosure.

FIG. 4 shows a schematic diagram of a high-level architecture of example storage management system 400 according to an embodiment of the present disclosure. In some embodiments, storage management system 400 may be used to implement storage management method 200 depicted in FIG. 2 and may be implemented in computing device 110 depicted in FIG. 1. In other embodiments, one or more of the various modules, units, or components in storage management system 400 may be implemented in different computing devices. In addition, in some embodiments, storage management system 400 may be implemented as a part of the storage system. In other embodiments, storage management system 400 may also be implemented independently of the storage system. In addition, it should be pointed out that the organizational structure shown in storage management system 400 is not limited to the storage system, but may be generally applied to any system that needs to analyze the cause of a fault. In this sense, storage management system 400 may also be referred to as a general problem analysis system or a general triage engine having the capacity of digging out the root cause of a fault.

As shown in FIG. 4, storage management system 400 may include classifier (also referred to as a classification subsystem) 410, inference engine (also referred to as an inference engine subsystem) 420, and analyzer (also referred to as an analyzer subsystem) 430. Classifier 410 may define and identify various faults (or problems) from description information 105 of the fault, and classify them into one of the predefined fault categories. In some embodiments, classifier 410 may include many configurable rules on how to identify the fault category according to description information 105 (also referred to as defect information).

Inference engine 420 may perform inference based on fault diagnosis data 300 including hierarchical structure 115 of fault causes (for example, a classification decision tree of fault causes). In some embodiments, the classification decision tree may associate all fault causes with different technical fields. It should be pointed out that inference engine 420 may be a general inference engine which may use different classification decision trees to adapt to different products or systems.

Analyzer 430 may analyze fault causes at a deeper level according to log data 425 (for example, offline log data) or real-time system inspection, or confirm whether a certain type of fault or problem has occurred or not in a particular technical field. In some embodiments, analyzer 430 may provide detailed functions and methods for analyzing the root cause of the problem from the deepest level. In some embodiments, analyzer 430 may correspond to the fault analysis components described above. It should be noted that, in the case where each fault function in hierarchical structure 115 has a corresponding fault analysis component (or analyzer), analyzer 430 described in FIG. 4 may refer to a collection of all analyzers. In some embodiments, analyzer 430 may follow a general application programming interface (API) to communicate with inference engine 420 and other components in the system.

Through storage management system 400, the embodiments of the present disclosure may provide a general fault analysis system across products, which can identify fault categories based on description information 105 (also referred to as fault reports) of the fault, and then classify the fault categories and find out the root cause. In addition, storage management system 400 may be decoupled from a particular product, that is, has nothing to do with any particular product, and may easily define and update the classification decision tree of any product. In some embodiments, various analyzers 430 may naturally have a corresponding relationship with the technical architecture of the product, so that a plurality of corresponding analyzers 430 may be provided according to each product design. For example, these analyzers 430 may be owned and maintained by different engineering teams of the product. An example workflow of storage management system 400 will be described below with reference to FIG. 5.

Figure 5:
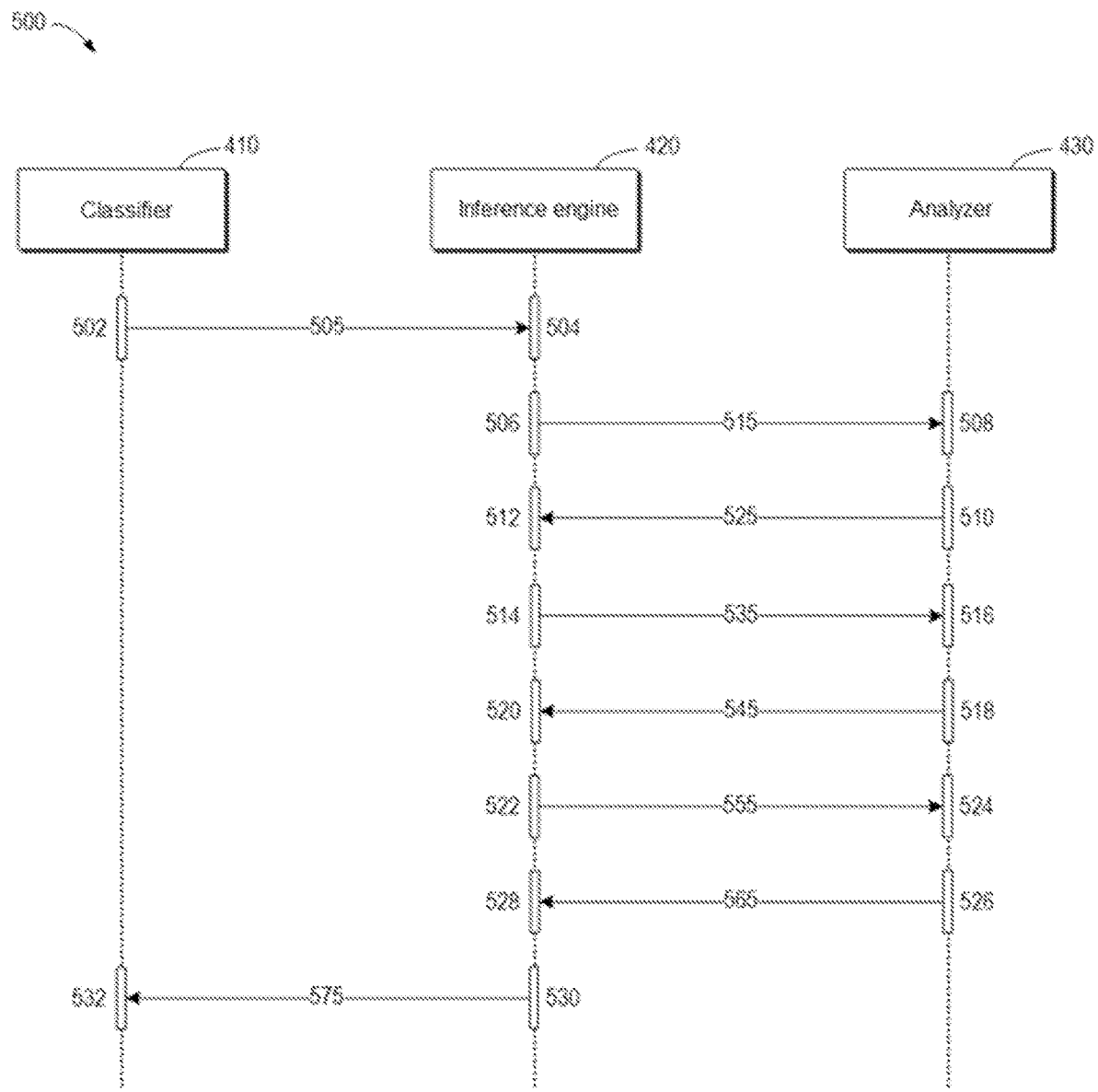
FIG. 5 shows an example interaction process among a classifier, an inference engine, and an analyzer according to an embodiment of the present disclosure.

FIG. 5 shows example interaction process 500 among classifier 410, inference engine 420, and analyzer 430 according to an embodiment of the present disclosure. It should be noted that, in the case where there is a corresponding analyzer for each fault cause in hierarchical structure 115, analyzer 430 in FIG. 5 may refer to a collection of all analyzers. When related operations for a certain fault cause are specifically performed, operations performed by analyzer 430 depicted in FIG. 5 may be completed by a particular analyzer corresponding to a particular fault cause. For ease of description, interaction process 500 will be illustrated with reference to example hierarchical structure 115 depicted in FIG. 3.

As shown in FIG. 5, assuming that classifier 410 classifies a fault into fault category 302 in FIG. 3 based on description information 105 of the fault, classifier 410 may send (502) fault category information 505 indicating fault category 302 to inference engine 420. Therefore, inference engine 420 may receive (504) fault category information 505 from classifier 410, thereby determining that the fault belongs to fault category 302. Then, inference engine 420 may determine fault causes 311 and 313 at the first level associated therewith based on fault category 302 indicated by fault category information 505. After fault causes 311 and 313 at the first level are determined, inference engine 420 may send (506) fault analysis request 515 to analyzer 430 (for example, the analyzer of fault cause 311). In other words, inference engine 420 may schedule the analyzer of fault cause 311 to perform fault analysis on fault cause 311.

In the example depicted in FIG. 5, after receiving (508) fault analysis request 515 from inference engine 420, analyzer 430 (for example, the analyzer of fault cause 311) may determine that the fault is not caused by fault cause 311. Therefore, analyzer 430 (for example, the analyzer of fault cause 311) may send (510) negative message 525 for fault cause 311 to inference engine 420 to indicate to inference engine 420 that the fault is not caused by fault cause 311.

After receiving (512) negative message 525 from analyzer 430 (for example, the analyzer of fault cause 311), inference engine 420 may send (514) fault analysis request 535 to analyzer 430 (for example, the analyzer of fault cause 313). In other words, inference engine 420 may schedule the analyzer of fault cause 313 to perform fault analysis on fault cause 313. In the example described in FIG. 5, after receiving (516) fault analysis request 535 from inference engine 420, analyzer 430 (for example, the analyzer of fault cause 313) may determine that the fault is caused by fault cause 313, and further determine that the fault is caused by fault cause 329 at the second level under fault cause 313. Therefore, analyzer 430 (for example, the analyzer of fault cause 313) may send (518) indication information 545 of fault cause 329 to inference engine 420 to indicate to inference engine 420 that the fault is caused by a deeper level fault cause 329.

After receiving (520) indication information 545 of fault cause 329 from analyzer 430 (for example, the analyzer of fault cause 313), inference engine 420 may send (522) fault analysis request 555 to analyzer 430 (for example, the analyzer of fault cause 329). In other words, inference engine 420 may schedule the analyzer of fault cause 329 to perform fault analysis on fault cause 329.

After receiving (524) fault analysis request 555 from inference engine 420, analyzer 430 (for example, the analyzer of fault cause 329) may determine that the fault is caused by fault cause 329, and further determine that there are no fault causes at the third level under fault cause 329. Therefore, analyzer 430 (for example, the analyzer of fault cause 329) may send (526) positive message 565 to inference engine 420 to indicate to inference engine 420 that the fault is caused by fault cause 329. After receiving (528) positive message 565 from analyzer 430 (for example, the analyzer of fault cause 329), inference engine 420 may send (532) fault analysis result 575 to an initiator (for example, classifier 410) of the fault cause analysis, that is, target fault cause 125 at the deepest level (or root cause) of the fault is fault cause 329.

It can be seen that no matter how complex the product in need of fault analysis is, and no matter how many steps the fault analysis needs to perform, the embodiments of the present disclosure may reason as deeply as possible and find out the root cause of the fault (or problem). For example, the ability of the embodiment of the present disclosure to finally determine the root cause may depend on product design and log collection. In addition, if the fault analysis data checked by the embodiment of the present disclosure directly comes from the diagnosis of a real-time system, the embodiment of the present disclosure may also be applicable to the diagnosis of the real-time system.

Figure 6:
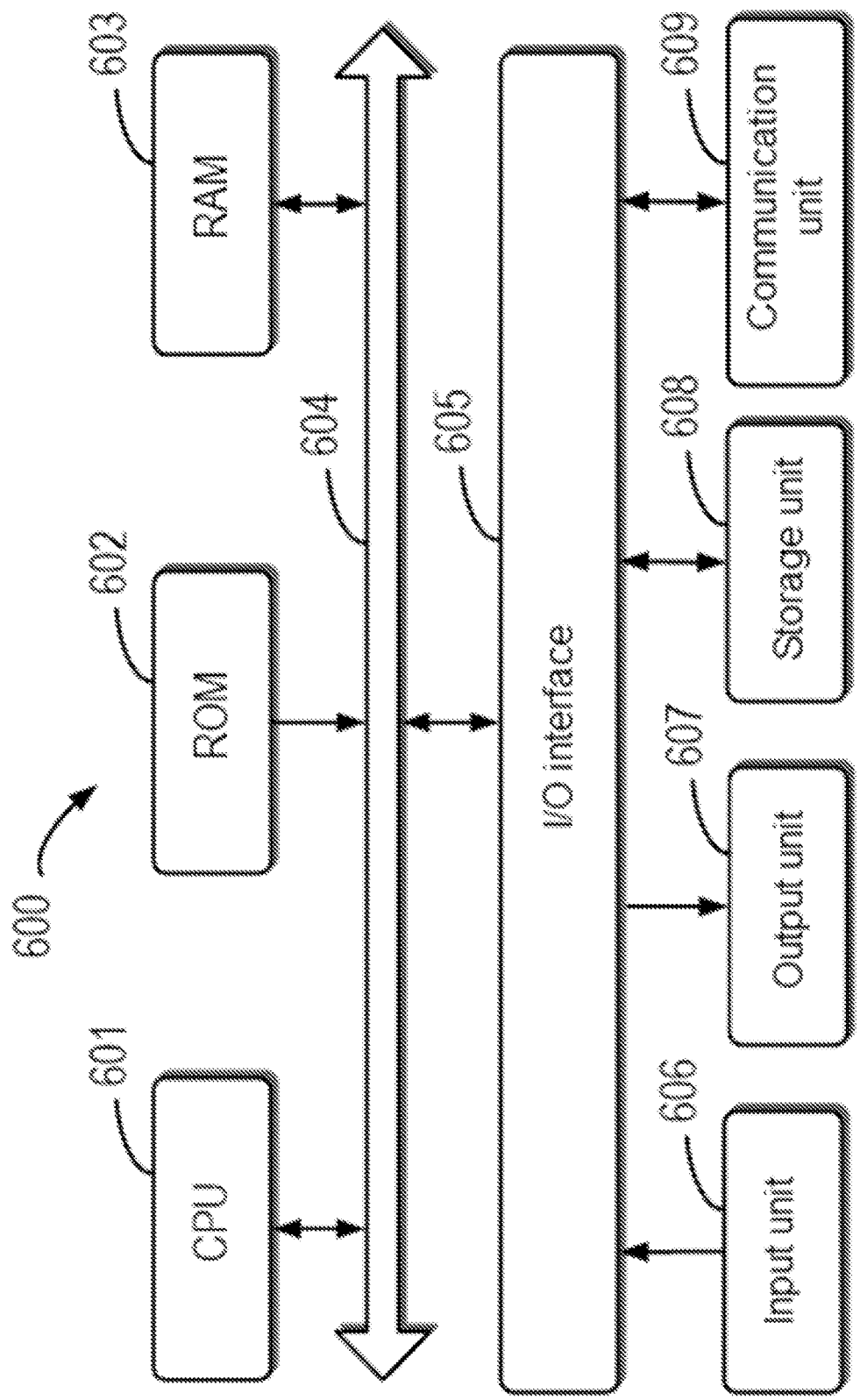
FIG. 6 is a block diagram of an example device that may be used to implement an embodiment of the present disclosure.

FIG. 6 shows a block diagram of example device 600 that may be used to implement an embodiment of the present disclosure. In some embodiments, example device 600 may be an electronic device, which may be configured to implement computing device 110 in FIG. 1. As shown in FIG. 6, example device 600 includes central processing unit (CPU) 601, which may perform various appropriate actions and processing according to computer program instructions stored in read-only memory (ROM) 602 or computer program instructions loaded from storage unit 608 to random access memory (RAM) 603. In RAM 603, various programs and data required for the operation of example device 600 may also be stored. CPU 601, ROM 602, and RAM 603 are connected to one another through bus 604. Input/output (I/O) interface 605 is also connected to bus 604.

A plurality of components in example device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows example device 600 to exchange information/data with other devices over a computer network such as the Internet and/or various telecommunication networks.

The various processes and processing described above, such as example methods or example processes, may be performed by processing unit 601. For example, in some embodiments, various example methods or example processes may be implemented as a computer software program that is tangibly contained in a machine-readable medium such as storage unit 608. In some embodiments, part or all of the computer program may be loaded and/or installed onto example device 600 via ROM 602 and/or communication unit 609. When the computer program is loaded into RAM 603 and executed by CPU 601, one or more steps of the example method or example process described above may be executed.

As used herein, the term "include" and similar terms thereof should be understood as open-ended inclusion, i.e., "including but not limited to." The term "based on" should be understood as "based at least in part on." The term "one embodiment" or "the embodiment" should be understood as "at least one embodiment." The terms "first," "second," etc. may refer to different or the same objects. Other explicit and implicit definitions may also be included below.

As used herein, the term "determine" encompasses a variety of actions. For example, "determine" may include operating, computing, processing, exporting, surveying, searching (for example, searching in a table, a database, or another data structure), identifying, and the like. In addition, "determine" may include receiving (for example, receiving information), accessing (for example, accessing data in a memory), and the like. In addition, "determine" may include parsing, selecting, choosing, establishing, and the like.

It should be noted that the embodiments of the present disclosure may be implemented by hardware, software, or a combination of software and hardware. The hardware part may be implemented using dedicated logic. The software part may be stored in a memory and executed by an appropriate instruction execution system, such as a microprocessor or dedicated design hardware. Those skilled in the art can understand that the above-mentioned devices and methods may be implemented by using computer-executable instructions and/or by being included in processor control code, and for example, such code is provided on a programmable memory or a data carrier such as an optical or electronic signal carrier.

In addition, although the operations of the method of the present disclosure are described in a specific order in the drawings, this does not require or imply that these operations must be performed in the specific order, or that all the operations shown must be performed to achieve the desired result. Rather, the order of execution of the steps depicted in the flowchart can be changed. Additionally or alternatively, some steps may be omitted, multiple steps may be combined into one step for execution, and/or one step may be decomposed into multiple steps for execution. It should also be noted that the features and functions of two or more apparatuses according to the present disclosure may be embodied in one apparatus. On the contrary, the features and functions of one apparatus described above may be embodied by further dividing the apparatus into a plurality of apparatuses.

Although the present disclosure has been described with reference to several specific embodiments, it should be understood that the present disclosure is not limited to the specific embodiments disclosed. The present disclosure is intended to cover various modifications and equivalent arrangements included within the spirit and scope of the appended claims.

What is claimed is:

1. A method, comprising:
    based on description information of a fault of a storage system, determining, by a system comprising a processor and a group of fault analysis components, that the fault belongs to a fault category of a group of fault categories;
    determining, by the system, at least one first fault cause associated with the fault category at a first level of a hierarchical structure of fault causes, wherein each fault cause of the hierarchical structure is associated with a distinct fault analysis component of the group of fault analysis components configured to determine whether the fault cause is a cause of the fault;
    determining, by the system, via execution of respective first distinct fault analysis components of the at least one first fault cause, a first fault cause that causes the fault among the at least one first fault cause; and
    determining, by the system, via execution of respective second distinct fault analysis components of a set of fault causes that depend from the first fault cause in the hierarchical structure, a target fault cause at a deepest level of the hierarchical structure of fault causes that causes the fault.

2. The method according to claim 1, wherein determining the target fault cause comprises:
    in response to determining that the first fault cause is not associated with at least one second fault cause in a second level of the hierarchical structure that depends on the first fault cause, determining the first fault cause as the target fault cause.

3. The method according to claim 1, wherein determining the target fault cause comprises:
    in response to determining that the first fault cause is associated with at least one second fault cause in a second level of the hierarchical structure that depends on the first fault cause, determining, at the second level of the hierarchical structure, a second fault cause of the at least one second fault cause that causes the fault; and
    determining the target fault cause based on the second fault cause.

4. The method according to claim 3, wherein determining the target fault cause based on the second fault cause comprises:
    in response to determining that the second fault cause is associated with at least one third fault cause in a third level of the hierarchical structure that depends on the second fault cause, determining, at the third level, a third fault cause of the at least one third fault cause that causes the fault; and
    determining the target fault cause based on the third fault cause.

5. The method according to claim 3, wherein determining the target fault cause based on the second fault cause comprises:
    in response to determining that the second fault cause is not associated with at least one third fault cause in a third level of the hierarchical structure that depends on the second fault cause, determining the second fault cause as the target fault cause.

6. The method according to claim 3, wherein determining the second fault cause comprises:
    based on log data associated with a group of fault causes at the second level, determining the second fault cause among the group of fault causes.

7. The method according to claim 1, wherein determining the at least one first fault cause comprises:
    determining the at least one first fault cause based on fault diagnosis data, wherein the fault diagnosis data records the correlation between the group of fault categories and the first level of the hierarchical structure.

8. The method according to claim 1, wherein determining the first fault cause comprises:
    determining the first fault cause based on the log data associated with the at least one first fault cause.

9. The method according to claim 1, wherein determining the fault category comprises:
    classifying the fault into the fault category based on configurable classification rules.

10. The method according to claim 1, further comprising:
    in response to a new fault cause, which is not comprised in the hierarchical structure, being determined, adding the new fault cause into the hierarchical structure.

11. The method according to claim 1, wherein the hierarchical structure comprises a tree structure of fault causes.

12. A device, comprising:
    at least one processor; and
    at least one memory storing computer program instructions, wherein the at least one memory and the computer program instructions are configured to cause, along with the at least one processor, the device to perform operations, comprising:
        determining, based on description information of a fault of a storage system, that the fault belongs to a fault category of a plurality of fault categories;
        determining at least one first fault cause associated with the fault category at a first level of a hierarchical data structure of fault causes, wherein each fault cause of the hierarchical data structure comprises a distinct fault analysis component of a group of fault analysis components configured to determine whether the fault cause is a cause of the fault;
        determining, via execution of respective first distinct fault analysis components of the at least one first fault cause, a first fault cause that causes the fault among the at least one first fault cause; and
        determining, via execution of respective second distinct fault analysis components of a set of fault causes that depend from the first fault cause in the hierarchical data structure, a target fault cause at a deepest level of the hierarchical data structure of fault causes that causes the fault.

13. The device according to claim 12, wherein determining the target fault cause comprises:
based on determining that the first fault cause is not associated with at least one second fault cause in a second level of the hierarchical data structure that depends on the first fault cause, determining the first fault cause as the target fault cause; or
based on determining that the first fault cause is associated with at least one second fault cause in the second level of the hierarchical data structure that depends on the first fault cause:
determining, at the second level, a second fault cause of the at least one second fault cause that causes the fault, and
determining the target fault cause based on the second fault cause.

14. The device according to claim 13, wherein determining the target fault cause based on the second fault cause comprises:
based on determining that the second fault cause is associated with at least one third fault cause in a third level of the hierarchical data structure that depends on the second fault cause:
determining, at the third level, a third fault cause that causes the fault, and
determining the target fault cause based on the third fault cause; or
based on determining that the second fault cause is not associated with at least one third fault cause in the third level of the hierarchical data structure that depends on the second fault cause, determining the second fault cause as the target fault cause.

15. The device according to claim 12, wherein determining the at least one first fault cause comprises:
determining the at least one first fault cause based on fault diagnosis data, wherein the fault diagnosis data records the correlation between the plurality of fault categories and the first level of the hierarchical data structure.

16. The device according to claim 12, wherein determining the first fault cause comprises:
determining the first fault cause based on the log data associated with the at least one first fault cause.

17. The device according to claim 12, wherein determining the fault category comprises classifying the fault into the fault category based on configurable classification rules,
wherein the operations further comprise, based on a new fault cause, which is not comprised in the hierarchical data structure, having been determined, adding the new fault cause into the hierarchical data structure, or
wherein the hierarchical data structure comprises a tree structure of fault causes.

18. A non-transitory computer program product stored on a non-volatile computer-readable medium and comprising machine-executable instructions, wherein the machine-executable instructions, when executed, cause a machine comprising a processor and a group of fault analysis components to perform operations comprising:
based on description information of a fault of a storage system, determining that the fault belongs to a fault category of a group of fault categories;
determining at least one first fault cause associated with the fault category at a first level of a hierarchical structure of fault causes, wherein each fault cause of the hierarchical structure is associated with a distinct fault analysis component of the group of fault analysis components configured to determine whether the fault cause is a cause of the fault;
determining, via execution of respective first distinct fault analysis components of the at least one first fault cause, a first fault cause that causes the fault among the at least one first fault cause; and
determining, via execution of respective second distinct fault analysis components of a set of fault causes that depend from the first fault cause in the hierarchical structure, a target fault cause at a deepest level of the hierarchical structure of fault causes that causes the fault.

19. The non-transitory computer program product according to claim 18, wherein the operations further comprise:
based on determining that the first fault cause is not associated with at least one second fault cause in a second level of the hierarchical structure that depends on the first fault cause, determining the first fault cause as the target fault cause; or
based on determining that the first fault cause is associated with at least one second fault cause in the second level of the hierarchical data structure that depends on the first fault cause:
determining, at the second level, a second fault cause of the at least one second fault cause that causes the fault, and
determining the target fault cause based on the second fault cause.

20. The non-transitory computer program product according to claim 19, wherein the operations further comprise:
based on determining that the second fault cause is associated with at least one third fault cause in a third level of the hierarchical data structure that depends on the second fault cause:
determining, at the third level, a third fault cause that causes the fault, and
determining the target fault cause based on the third fault cause; or
based on determining that the second fault cause is not associated with at least one third fault cause in the third level of the hierarchical data structure that depends on the second fault cause, determining the second fault cause as the target fault cause.

* * * * *